(12) United States Patent
Retersdorf

(10) Patent No.: US 11,377,218 B1
(45) Date of Patent: Jul. 5, 2022

(54) FLEXIBLE TURBINE ARRANGEMENT AIR CYCLE MACHINE WITH ADAPTIVE HEAT EXCHANGER

(71) Applicant: Hamilton Sundstrand Corporation, Charlotte, NC (US)

(72) Inventor: Alan Retersdorf, Avon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/125,546

(22) Filed: Dec. 17, 2020

(51) Int. Cl.
*B64D 13/08* (2006.01)
*B64D 13/02* (2006.01)
*B64D 13/06* (2006.01)

(52) U.S. Cl.
CPC .............. *B64D 13/08* (2013.01); *B64D 13/02* (2013.01); *B64D 2013/0618* (2013.01); *B64D 2013/0688* (2013.01)

(58) Field of Classification Search
CPC ........ B64D 13/08; B64D 13/06; B64D 13/02; B64D 13/006; B64D 2013/0618; B64D 2013/0688; B64D 2013/0611; B64D 2013/064; B64D 2013/0644; B64D 2013/0655; B64D 2221/00; B64D 33/02; B64D 33/04; F02C 6/08
See application file for complete search history.

(56) References Cited

U.S. PATENT DOCUMENTS

| 2,486,472 | A | * | 11/1949 | Harris | B64D 13/08 165/223 |
| 2,923,222 | A | * | 2/1960 | Manning | B64D 13/08 236/13 |
| 6,250,097 | B1 | | 6/2001 | Lui et al. | |
| 7,334,423 | B2 | | 2/2008 | Bruno et al. | |

(Continued)

FOREIGN PATENT DOCUMENTS

EP 2886462 A1 6/2015
EP 2985224 A1 2/2016
(Continued)

OTHER PUBLICATIONS

Extended European Search Report dated Feb. 23, 2022, received for corresponding European Application No. 21197946.3, pp. 19.
(Continued)

*Primary Examiner* — Gordon A Jones
(74) *Attorney, Agent, or Firm* — Kinney & Lange, P.A.

(57) ABSTRACT

A system includes a primary heat exchanger with a first passage connected to a hot fluid source, a second passage connected to the first passage, and a third passage connected to the second passage and an outlet line. A compressor inlet is connected to the outlet line. A secondary heat exchanger is connected to a compressor outlet. First and second turbines are connected to an outlet of the secondary heat exchanger. A first load heat exchanger is connected to the first turbine. A second load heat exchanger is between the second turbine and a system outlet. A first valve connects the hot fluid source to the second and third passages. A second (Continued)

valve connects the first and second passages with the outlet line. A third valve is between the secondary heat exchanger and the second turbine. A fourth valve is between the first load heat exchanger and the system outlet.

20 Claims, 5 Drawing Sheets

(56) References Cited

U.S. PATENT DOCUMENTS

| | | | | |
|---|---|---|---|---|
| 8,206,088 | B1* | 6/2012 | Plattner | B64D 13/06 415/177 |
| 9,656,755 | B2 | 5/2017 | Durbin et al. | |
| 10,408,501 | B2 | 9/2019 | Elsherbini et al. | |
| 10,457,399 | B2* | 10/2019 | Bammann | B64D 13/06 |
| 2004/0194493 | A1* | 10/2004 | Army, Jr. | F28D 9/0093 62/402 |
| 2008/0022688 | A1* | 1/2008 | Decrisantis | B64D 13/06 60/751 |
| 2008/0110603 | A1 | 5/2008 | Fellague et al. | |
| 2009/0291625 | A1* | 11/2009 | Klimpel | B64D 13/02 454/71 |
| 2014/0202663 | A1 | 7/2014 | Shea | |
| 2015/0314878 | A1 | 11/2015 | Lukens et al. | |
| 2016/0047561 | A1* | 2/2016 | Army, Jr. | B23P 15/26 137/624.27 |
| 2016/0161189 | A1* | 6/2016 | Borghese | F28D 9/0093 165/140 |
| 2017/0106985 | A1* | 4/2017 | Stieger | B64D 13/02 |
| 2019/0283898 | A1* | 9/2019 | D'Orlando | B64D 13/06 |
| 2021/0394910 | A1* | 12/2021 | Ciais | B64D 13/08 |

FOREIGN PATENT DOCUMENTS

| | | |
|---|---|---|
| EP | 3219619 A1 | 9/2017 |
| EP | 3421364 A1 | 1/2019 |
| EP | 3517875 A1 | 7/2019 |
| JP | 2003240375 A | 8/2003 |

OTHER PUBLICATIONS

Extended European Search Report for EP Application No. 19214569.6, dated Jun. 23, 2020, 7 pages.

* cited by examiner

FLEXIBLE TURBINE ARRANGEMENT AIR CYCLE MACHINE WITH ADAPTIVE HEAT EXCHANGER

BACKGROUND

The present disclosure relates to an environmental control system ("ECS") and more particularly, to the management of air through the ECS.

The ECS aboard a vehicle takes an engine bleed fluid and cools that engine bleed fluid to utilize the cooled fluid elsewhere in the vehicle. The ECS provides conditioned air to the vehicle's compartments, e.g., a cabin of a vehicle or an aircraft, a cockpit of a vehicle or an aircraft, and/or any other compartment that requires cooling onboard a vehicle of an aircraft. An air cycle machine ("ACM") powers the ECS and is expected to operate over a wide range of ambient conditions, loading conditions, and engine bleed conditions. Achieving the required performance level from the ACM over such a wide range of conditions in a typical ECS results in pressure losses and inefficiencies.

SUMMARY

In one example, an environmental control system includes a primary heat exchanger with a first hot section, including a first passage fluidically connected to a hot fluid source. A second hot section includes a second passage fluidically connected to the first passage, and a third hot section includes a third passage fluidically connected to the second passage. A heat exchanger outlet line fluidically connected to the second passage and a bypass line fluidically connecting both the first passage and the second passage with the heat exchanger outlet line. The environmental control system also includes an air cycle machine, including a compressor, wherein an inlet of the compressor is fluidically connected to the heat exchanger outlet line. A secondary heat exchanger fluidically connected to an outlet of the compressor, a first turbine, and a second turbine, wherein the first and second turbines are fluidically connected to an outlet of the secondary heat exchanger. The first and second turbines are mechanically coupled to the compressor via a shaft. A first load cooling heat exchanger fluidically connected to the first turbine and a second load cooling heat exchanger fluidically connected between the second turbine and a system outlet. The environmental control system also includes a first valve, wherein the first valve fluidically connects the hot fluid source and the second passage when the first valve is open. The first valve fluidically connects the hot fluid source and the third passage when the first valve is open. A second valve in the bypass line and a third valve fluidically connected between the secondary heat exchanger and the second turbine. A fourth valve fluidically connected between the first load cooling heat exchanger and the system outlet.

In another example, a method of controlling flow in an environmental control system includes directing a first portion of an engine bleed fluid through a first passage of a primary heat exchanger. The primary heat exchanger also includes a second passage and a third passage. A second portion of the engine bleed fluid is directed through a first valve in an open position and into the second and third passage of the primary heat exchanger. The second portion is divided between the second passage and the third passage. The second portion of the engine bleed fluid is directed through the third passage to an outlet of the primary heat exchanger. The engine bleed fluid is directed through the outlet of the primary heat exchanger to an inlet of a compressor. The first portion of the engine bleed fluid from the first passage and the second portion of the engine bleed fluid from the second passage are directed to a second turbine via a bypass line when the second valve is in an opened position. The method also includes directing the engine bleed fluid from the second valve to the inlet of the compressor and compressing the engine bleed fluid via the compressor into a compressor exhaust fluid. The compressor is mechanically coupled to a first turbine and a second turbine via a shaft. The compressor exhaust fluid is directed through an outlet of the compressor and through a secondary heat exchanger. A first portion of the compressor exhaust fluid is directed into the first turbine and through a first load cooling heat exchanger. The compressor exhaust fluid is directed from the first load cooling heat exchanger and through a fourth valve to a system outlet. A second portion of the compressor exhaust fluid is directed through a third valve and into the second turbine when the third valve is in an open position. The second portion of the compressor exhaust fluid is directed from the second turbine through a second load cooling heat exchanger and to the system outlet.

Figure 1:
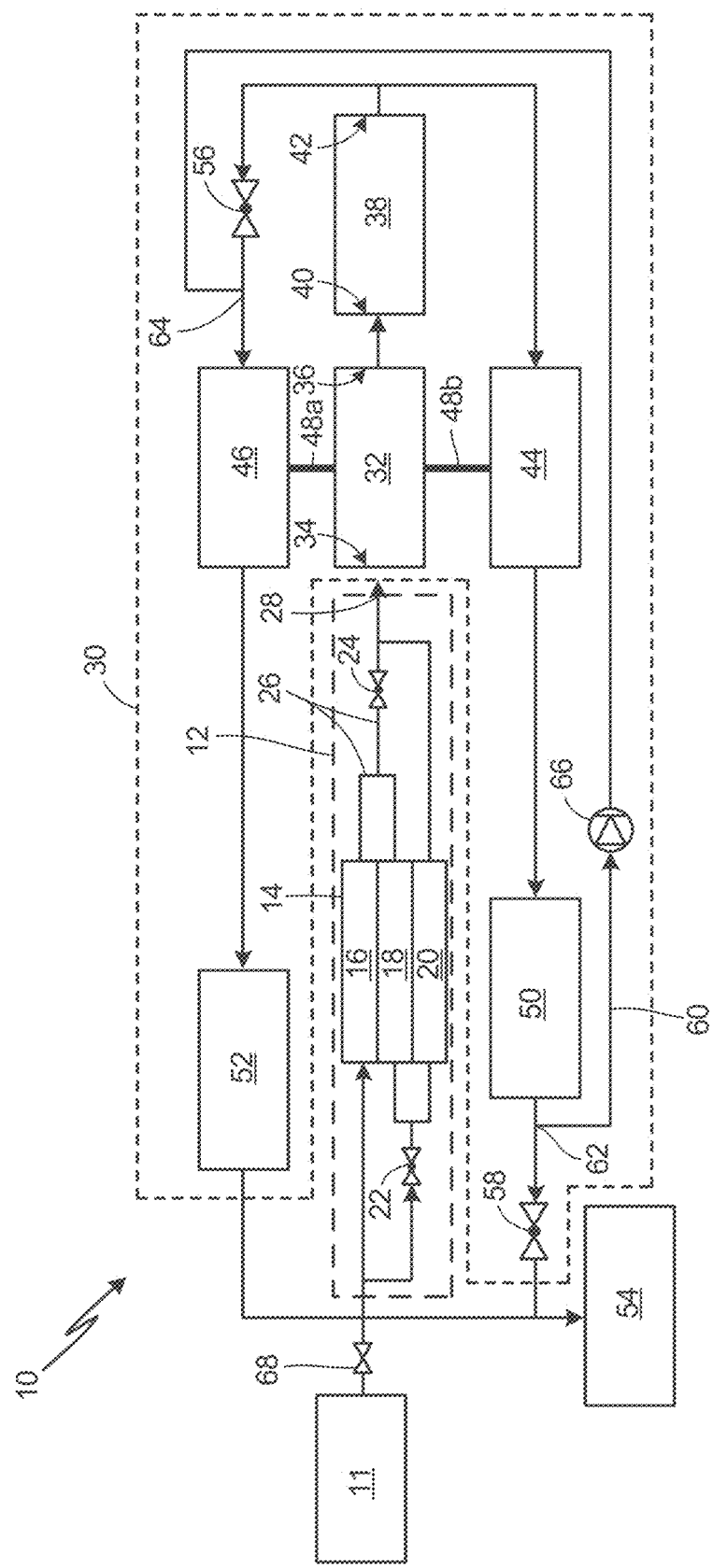
FIG. 1 is a schematic diagram of an environmental control system ("ECS") with an adaptive primary heat exchanger and an air cycle machine ("ACM").

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

In the present disclosure, an environmental control system ("ECS") includes several valves to alter a flow of a working fluid through the ECS to accommodate changes in the operating conditions of the ECS. The valves enable the ECS to adjust to changes in the operating conditions by regulating pressure loss across a primary heat exchanger system and altering expansion across the turbines of an air cycle machine ("ACM"). A first valve and a second valve control the flow of the working fluid through the primary heat exchanger, which can change between a cross-flow heat exchanger mode and a multi-pass heat exchanger mode by alternating the first and second valves from an open position to a closed position, respectively. A third valve and a fourth valve control the flow of the working fluid through the ACM, which can alternate the first and second turbines from being fluidically in parallel to fluidically in series by alternating the valves from an open position to a closed position, respectively. The ECS with the adaptive primary heat exchanger and ACM will be discussed below with reference to FIGS. 1-5.

FIG. 1 is a schematic diagram of ECS 10. As shown in FIG. 1, ECS 10 includes fluid source 11, primary heat exchanger assembly 12, ACM 30, system outlet 54, and pressure regulating valve 68. Primary heat exchanger assembly 12 includes heat exchanger 14, first valve 22, second valve 24, bypass line 26, and heat exchanger outlet 28. Heat exchanger 14 includes first hot section 16, second hot section 18, and third hot section 20. ACM 30 includes compressor 32, secondary heat exchanger 38, first turbine 44, second turbine 46, shafts (48a and 48b), first load cooling heat exchanger 50, second load cooling heat exchanger 52, third valve 56, fourth valve 58, and reroute line 60. Compressor 32 includes inlet 34 and outlet 36. Secondary heat exchanger 38 includes inlet 40 and outlet 42. Reroute line 60 includes inlet 62, outlet 64, and check valve 66.

Fluid source 11 provides a working fluid (shown in FIGS. 2-5) for ECS 10. Fluid source 11 can be from an engine bleed or any other pressurized fluid source onboard the aircraft. Fluid source 11 is fluidically connected to first hot section 16 of heat exchanger 14 via pressure-regulating valve 68. Pressure-regulating valve 68 is configured to regulate the pressure of the fluid that flows into ECS 10. First hot section 16 is also fluidically connected to second hot section 18. First hot section 16 includes at least one passage that traverses first hot section 16. Second hot section 18 is physically between first hot section 16 and third hot section 20, and is also fluidically connected to third hot section 20. Second hot section 18 includes at least one passage that traverses second hot section 18. Third hot section 20 is also fluidically connected to heat exchanger outlet 28. Third hot section 20 includes at least one passage that traverses third hot section 20.

Primary heat exchanger system 12 is configured to cool the working fluid from fluid source 11. Primary heat exchanger system 12 includes cold sections (not shown) to accompany each of hot sections (16, 18, and 20). Hot sections (16,18, and 20) and the cold sections include a plurality of fins (not shown) configured to promote heat transfer therebetween. First valve 22 and second valve 24 are devices configured to regulate, e.g., allow, prevent, or limit, a flow of the working fluid through primary heat exchanger system 12.

First valve 22 fluidically connects each of second hot section 18 and third hot section 20 directly to fluid source 11. When first valve 22 is open, working fluid can enter second hot section 18 without passing first through first hot section 16. When first valve 22 is open, working fluid can also enter third hot section 18 without first passing through first hot section 16 and second hot section 18. When first valve 22 is closed, working fluid only enters primary heat exchanger assembly 12 through first hot section 16. Bypass line 26 fluidically connects first hot section 16 and second hot section 18 to heat exchanger outlet 28. Second valve 24 is located in bypass line 26. When second valve 24 is open, flow in first hot section 16 can pass directly to heat exchanger outlet 28 via bypass line 26 without passing through second hot section 18 and third hot section 20. When second valve 24 is open, flow in second hot section 18 can also pass directly to heat exchanger outlet 28 via bypass line 26 without passing through third hot section 20.

Heat exchanger outlet 28 is fluidically connected to inlet 34 of compressor 32 of ACM 30. Outlet 36 of compressor 32 is fluidically connected to inlet 40 of secondary heat exchanger 38. Outlet 42 of secondary heat exchanger 38 is fluidically connected to first turbine 44 and to second turbine 46. Third valve 56 is positioned fluidically between outlet 42 of secondary heat exchanger 38 and second turbine 46. First turbine 44 is fluidically connected to first load cooling heat exchanger 50. First load cooling heat exchanger 50 is fluidically connected to system outlet 54. Fourth valve 58 is positioned fluidically between first load cooling heat exchanger 50 and system outlet 54. Inlet 62 of reroute line 60 is fluidically connected between first load cooling heat exchanger 50 and fourth valve 58. Outlet 64 of reroute line 60 is fluidically connected between second turbine 46 and third valve 56. Check valve 66 is located in reroute line 60 and allows the working fluid to flow through reroute line 50 from inlet 62 toward outlet 64, but prevents the working fluid from flowing backwards toward inlet 62 in reroute line 60. Second turbine 46 is fluidically connected to second load cooling heat exchanger 52, and second load cooling heat exchanger 52 is fluidically connected to system outlet 54. System outlet 54 can be connected to different parts of the aircraft, e.g., a cabin of the aircraft, a cockpit of the aircraft, and or any other compartment that requires cooling onboard the aircraft. Furthermore, system outlet 54 can be a connection to the ambient conditions outside of the aircraft to port the air overboard.

Compressor 32 of ACM 30 compresses and further cools the working fluid. The compressed working fluid exiting compressor 32 operates first turbine 44 and second turbine 44, thereby powering compressor 32 by rotating shafts 48a and 48b, respectively. In the embodiment of FIG. 1, shafts 48a and 48b are one unitary shaft. In another example, shafts 48a and 48b can be two different shafts connected to compressor 32 via gearing. The working fluid is further cooled in the heat exchangers (secondary heat exchanger 38, first load cooling heat exchanger 50, and second load cooling heat exchanger 52) of ACM 30. Secondary heat exchanger 38, first load cooling heat exchanger 50, and second load cooling heat exchanger 52 can each be a plate-fin, cross flow, counter-flow, or any other kind of heat exchanger used to transfer heat from one fluid to another. Third valve 56 and fourth valve 58 are devices configured to regulate, e.g., allow, prevent, or limit a flow of the working fluid through ACM 30.

Figure 2:
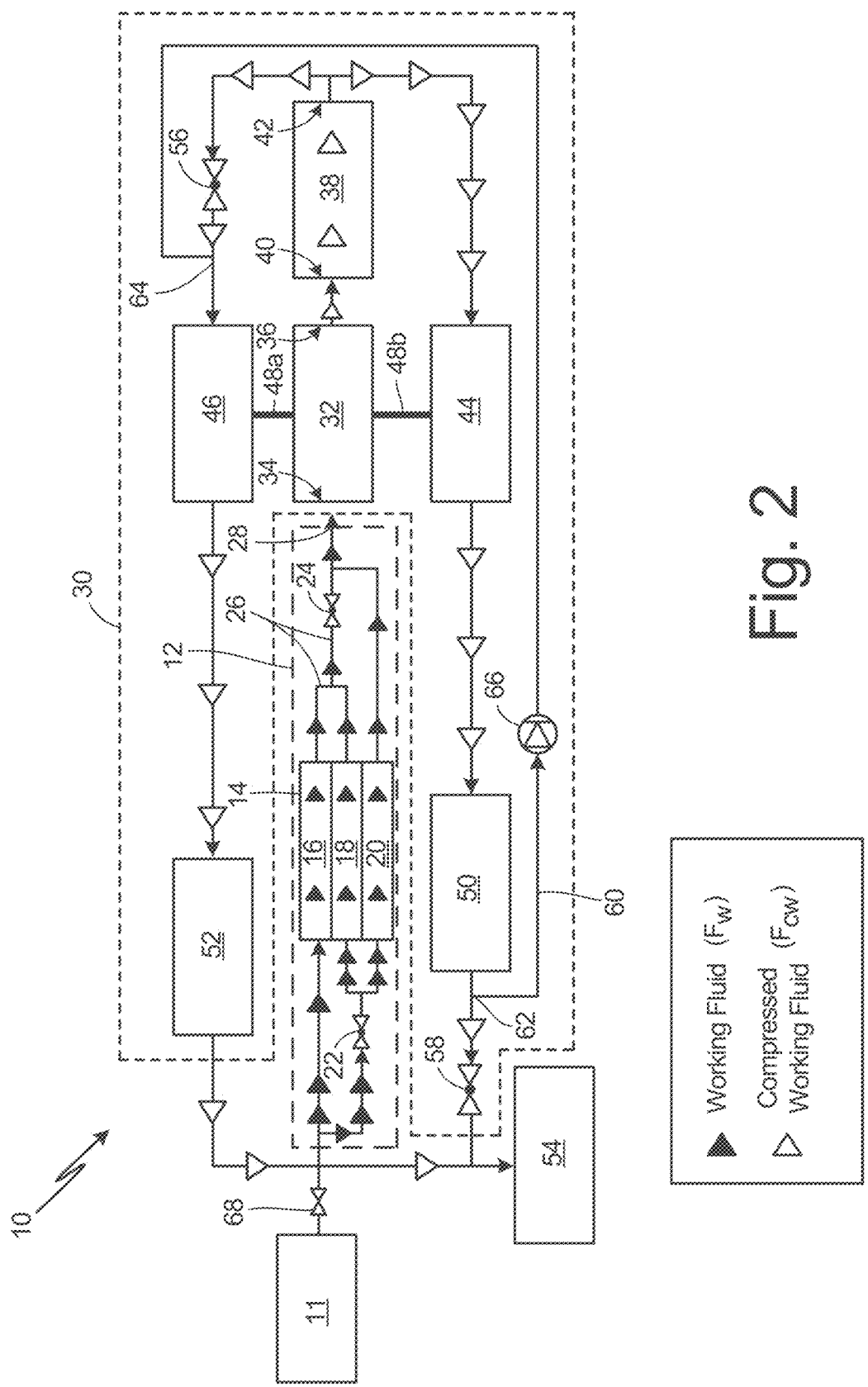
FIG. 2 is a schematic diagram of the ECS of FIG. 1 with a first, second, third, and fourth valve open.

FIG. 2 is a schematic diagram of ECS 10 with all of valves (22, 24, 56, and 58) open. When working fluid $F_W$ entering ECS 10 is at a low pressure, all of valves (22, 24, 56, and 58) are opened. Valves (22, 24, 56, and 58) can be electronic servo valves that are opened by an electronic controller, or valves (22, 24, 56, and 58) can be pneumatically controlled, or a combination thereof. With first valve 22 and second valve 24 open, working fluid $F_W$ from fluid source 11 passes through pressure-regulating valve 68 and splits. A portion of working fluid $F_W$ goes into first hot section 16, and another portion of working fluid $F_W$ goes through first valve 22 and into second section 18 and third section 20. The portion of working fluid $F_W$ in first section 16 and the portion of working fluid $F_W$ in second section 18 combines in bypass line 26 and flows through second valve 24 toward outlet 28. The portion of working fluid $F_W$ from third section 20 combines with the portion of working fluid $F_W$ from first section 16 and second section 18 downstream from second valve 24 and exits primary heat exchanger system 12 via outlet 28. Working fluid $F_W$ at outlet 28 is colder than working fluid $F_W$ because primary heat exchanger system 12 cools working fluid $F_W$. Ambient air or ram air (not shown) can be directed across primary heat exchanger system 12 to cool working fluid $F_W$.

Working fluid $F_W$ flows from outlet 28 of primary heat exchanger system 12 and into inlet 34 of compressor 32. Compressor 32 compresses working fluid $F_W$, which further cools working fluid $F_W$ and generates compressed working fluid $F_{CW}$. Compressed working fluid $F_{CW}$ then flows through outlet 36 of compressor 32 and into inlet 40 of secondary heat exchanger 38. Secondary heat exchanger 38 further cools compressed working fluid $F_{CW}$. Compressed working fluid $F_{CW}$ leaves secondary heat exchanger 38 via outlet 42. A first portion of compressed working fluid $F_{CW}$ flows to first turbine 44, and a second portion of compressed working fluid $F_{CW}$ flows through open third valve 56 and into second turbine 46. Compressed working fluid $F_{CW}$ turns first turbine 44 and second turbine 46, which turns shafts (48a and 48b) and powers compressor 32. The first portion of compressed working fluid $F_{CW}$ leaves first turbine 44 and goes through first load cooling heat exchanger 50. First load cooling heat exchanger 50 further cools the first portion of compressed working fluid $F_{CW}$. The first portion of compressed working fluid $F_{CW}$ leaves first load cooling heat exchanger 50, flows through open fourth valve 58, and then flows toward system outlet 54. The second portion of compressed working fluid $F_{CW}$ leaves second turbine 46 and goes through second load cooling heat exchanger 52. Second load cooling heat exchanger 52 further cools the second portion of compressed working fluid $F_{CW}$. The second portion of compressed working fluid $F_{CW}$ leaves second load cooling heat exchanger 52 and combines with the first portion of compressed working fluid $F_{CW}$ before compressed working fluid $F_{CW}$ leaves ECS 10 via system outlet 54.

Thus, when valves (22, 24, 56, and 56) are open primary heat exchanger system 12 operates as a cross-flow heat exchanger and first turbine 44 and second turbine 46 are fluidically connected in parallel. Because primary heat exchanger system 12 operates as a cross-flow heat exchanger, there is a decreased pressure drop across primary heat exchanger system 12. Furthermore, operating first turbine 44 and second turbine 46 in parallel decreases the pressure drop across ACM 30, thereby making the system more efficient when fluid source 11 is at a low pressure.

Figure 3:
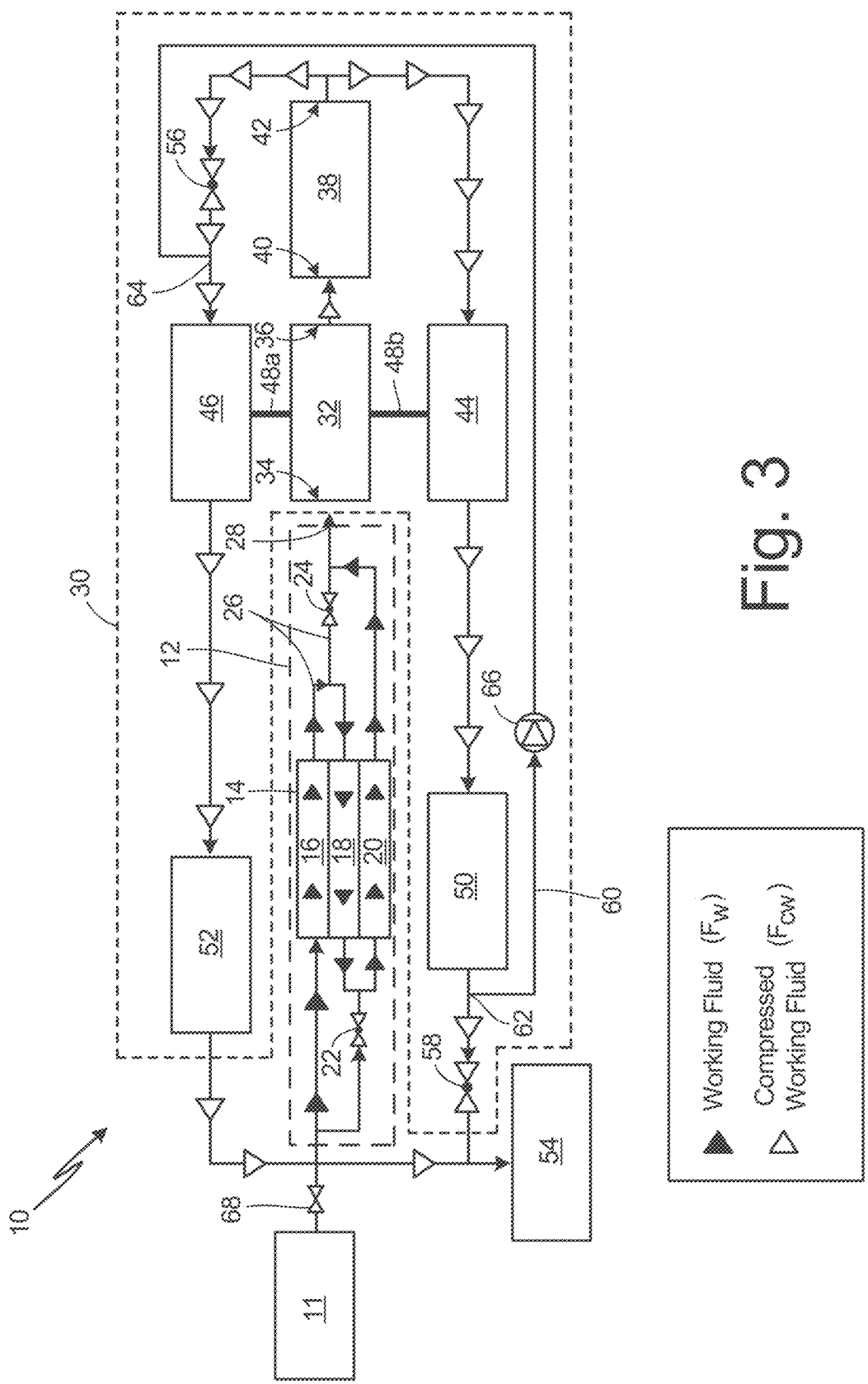
FIG. 3. is a schematic diagram of the ECS of FIG. 1 with a first and second valve closed and a third and fourth valve open.

FIG. 3 is a schematic diagram of ECS 10 with first valve 22 and second valve 24 closed, and third valve 56 and fourth valve 58 open. When fluid source 11 is at a medium pressure, first valve 22 and second valve 24 are closed while third valve 56 and fourth valve 58 remain open. With first valve 22 and second valve 24 closed, working fluid $F_W$ passes through pressure-regulating valve 68 and into first hot section 16. Working fluid $F_W$ flows from first hot section 16 into second hot section 18, then into third hot section 20, and then to outlet 28 of primary heat exchanger system 12.

Working fluid $F_W$ flows from outlet 28 of primary heat exchanger system 12 and into inlet 34 of compressor 32. Compressor 32 compresses working fluid $F_W$, which further cools working fluid $F_W$ and generates compressed working fluid $F_{CW}$. Compressed working fluid $F_{CW}$ then flows through outlet 36 of compressor 32 and into inlet 40 of secondary heat exchanger 38. Secondary heat exchanger 38 further cools compressed working fluid $F_{CW}$. Compressed working fluid $F_{CW}$ leaves secondary heat exchanger 38 via outlet 42. A first portion of compressed working fluid $F_{CW}$ flows to first turbine 44 and a second portion of compressed working fluid $F_{CW}$ flows through open third valve 56 and to second turbine 46. Compressed working fluid $F_{CW}$ turns first turbine 44 and second turbine 46, which turns shafts (48a and 48b) and powers compressor 32. The first portion of compressed working fluid $F_{CW}$ leaves first turbine 44 and goes through first load cooling heat exchanger 50. First load cooling heat exchanger 50 further cools the first portion of compressed working fluid $F_{CW}$. The first portion of compressed working fluid $F_{CW}$ leaves first load cooling heat exchanger 50, flows through open fourth valve 58, and then flows toward system outlet 54. The second portion of compressed working fluid $F_{CW}$ leaves second turbine 46 and goes through second load cooling heat exchanger 52. Second load cooling heat exchanger 52 further cools the second portion of compressed working fluid $F_{CW}$. The second portion of compressed working fluid $F_{CW}$ leaves second load cooling heat exchanger 52 and combines with the first portion of compressed working fluid $F_{CW}$ before compressed working fluid $F_{CW}$ leaves ECS 10 via system outlet 54.

Thus, when first valve 22 and second valve 24 are closed, and third valve 56 and fourth valve 58 are open, primary heat exchanger system 12 operates as a multi-pass heat exchanger and first turbine 44 and second turbine 46 are fluidically connected in parallel. With primary heat exchanger system 12 operating as a multi-pass heat exchanger, the pressure drop increases across primary heat exchanger system 12 and the cooling capacity for primary heat exchanger system 12 also increases. By increasing the pressure drop across primary heat exchanger system 12, excess pressure is removed from working fluid $F_W$ before working fluid $F_W$ arrives at compressor 32. However, the excess pressure removed from working fluid $F_W$ is not wasted but is used to push working fluid $F_W$ through more passes in primary heat exchanger system 12 to further cool working fluid $F_W$ before arriving at compressor 32. Using excess pressure in working fluid $F_W$ to further cool working fluid $F_W$ while delivering working fluid $F_W$ to compressor 32 at a pressure similar to the operation of FIG. 2 increases the efficiency of primary heat exchanger system 12. Therefore, the configuration shown in FIG. 3 is preferable when fluid source 11 is at a medium pressure.

Figure 4:
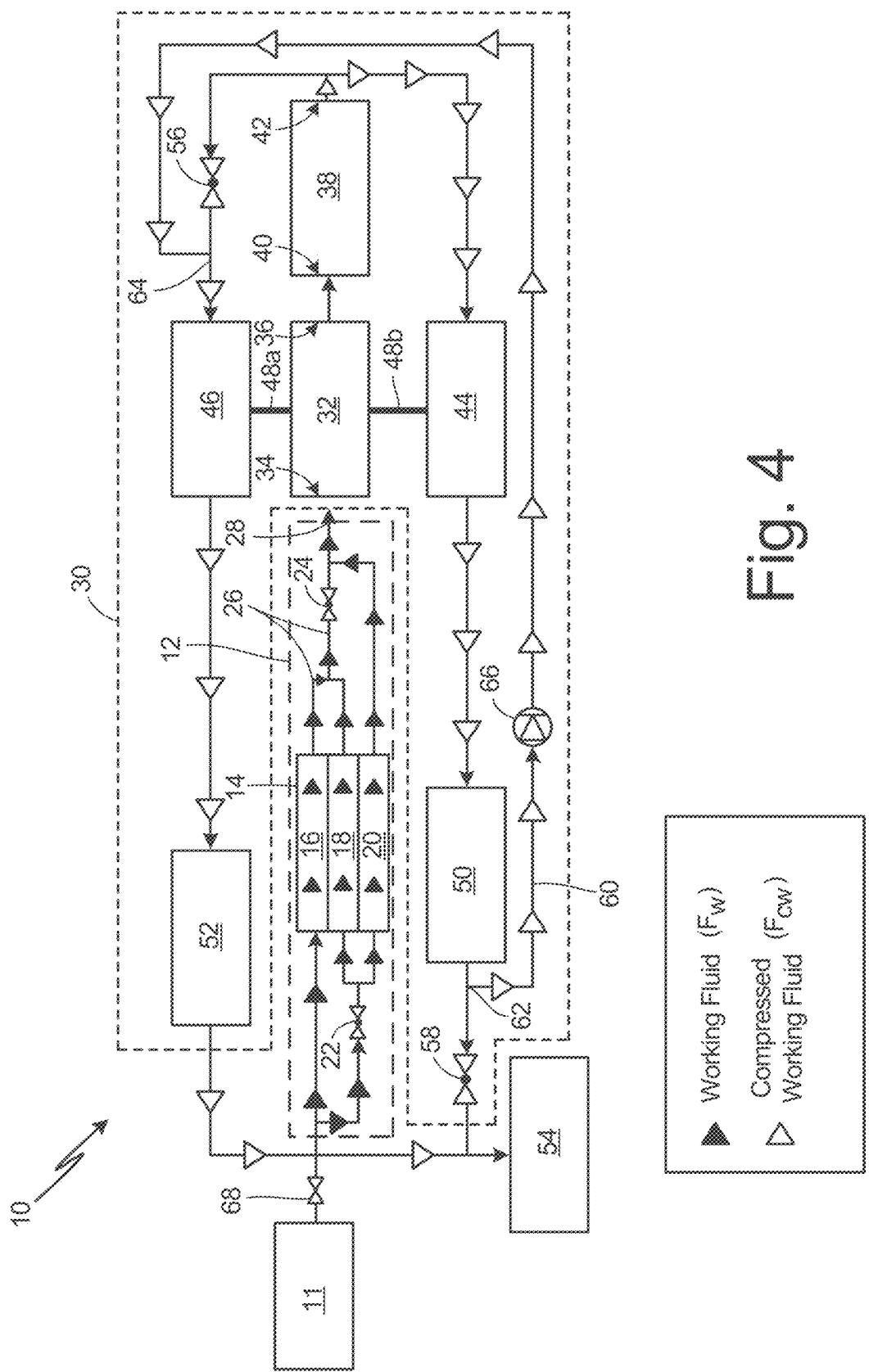
FIG. 4. is a schematic diagram of the ECS of FIG. 1 with a first and second valve open and a third and fourth valve closed.

FIG. 4 is a schematic diagram of ECS 10 with first valve 22 and second valve 24 open, and third valve 56 and fourth valve 58 closed. First valve 22 and second valve 24 can be open while third valve 56 and fourth valve 58 are closed when fluid source 11 is at a medium pressure, similar to the description of FIG. 3. When first valve 22 and second valve 24 are open, first heat exchanger system 12 operates as a cross-flow heat exchanger as described in detail above with reference to FIG. 2.

After working fluid $F_W$ flows through first heat exchanger system 12 in the manner described with reference to FIG. 2, working fluid $F_W$ flows from outlet 28 of primary heat exchanger system 12 and into inlet 34 of compressor 32. Compressor 32 compresses and further cools working fluid $F_W$ into compressed working fluid $F_{CW}$. Compressed working fluid $F_{CW}$ then flows through outlet 36 of compressor 32 and into inlet 40 of secondary heat exchanger 38. Secondary heat exchanger 38 further cools compressed working fluid $F_{CW}$. Compressed working fluid $F_{CW}$ leaves secondary heat exchanger 38 via outlet 42. With third valve 56 closed, all of compressed working fluid $F_{CW}$ flows from outlet 42 of secondary heat exchanger 38 to first turbine 44. Compressed working fluid $F_{CW}$ flows through first turbine 44, which turns shaft 48b and powers compressor 32. Compressed working fluid $F_{CW}$ leaves turbine 44 and flows into first load cooling heat exchanger 50. First load cooling heat exchanger 50 further cools compressed working fluid $F_{CW}$. With fourth valve 58 closed, compressed working fluid $F_{CW}$ leaves first load cooling heat exchanger 50 and flows into inlet 62 of reroute line 60. Reroute line 60 routes compressed working fluid $F_{CW}$ from inlet 62 to outlet 64, bypassing third valve 56. Compressed working fluid $F_{CW}$ flows from outlet 64 of bypass line 60 into second turbine 46, which turns shaft 48b and powers compressor 32. From second turbine 46, compressed working fluid $F_{CW}$ flows into second load cooling heat exchanger 52, which further cools compressed working fluid $F_{CW}$. Lastly, compressed working fluid $F_{CW}$ leaves ECS 10 through system outlet 54.

Thus, when first valve 22 and second valve 24 are open, and third valve 56 and fourth valve 58 are closed, primary heat exchanger system 12 operates as a cross-flow heat exchanger, and first turbine 44 and second turbine 46 are fluidically connected in series. With primary heat exchanger 12 functioning as a cross-flow heat exchanger, the pressure drop decreases across heat exchanger 12. With first turbine 44 and second turbine 46 fluidically in series increases, the pressure drop across first turbine 44 and second turbine 46 increases while compressed working fluid $F_{CW}$ undergoes more expansion across turbines (44 and 46) than when third valve 56 and fourth valve 58 are open. The increased expansion across turbines (44 and 46) increases the power output from turbines (44 and 46) in ECS 10 while eliminating excess pressure from compressed working fluid $F_{CW}$. Therefore, the configuration shown in FIG. 4 is preferable when fluid source 11 is at a medium pressure.

Figure 5:
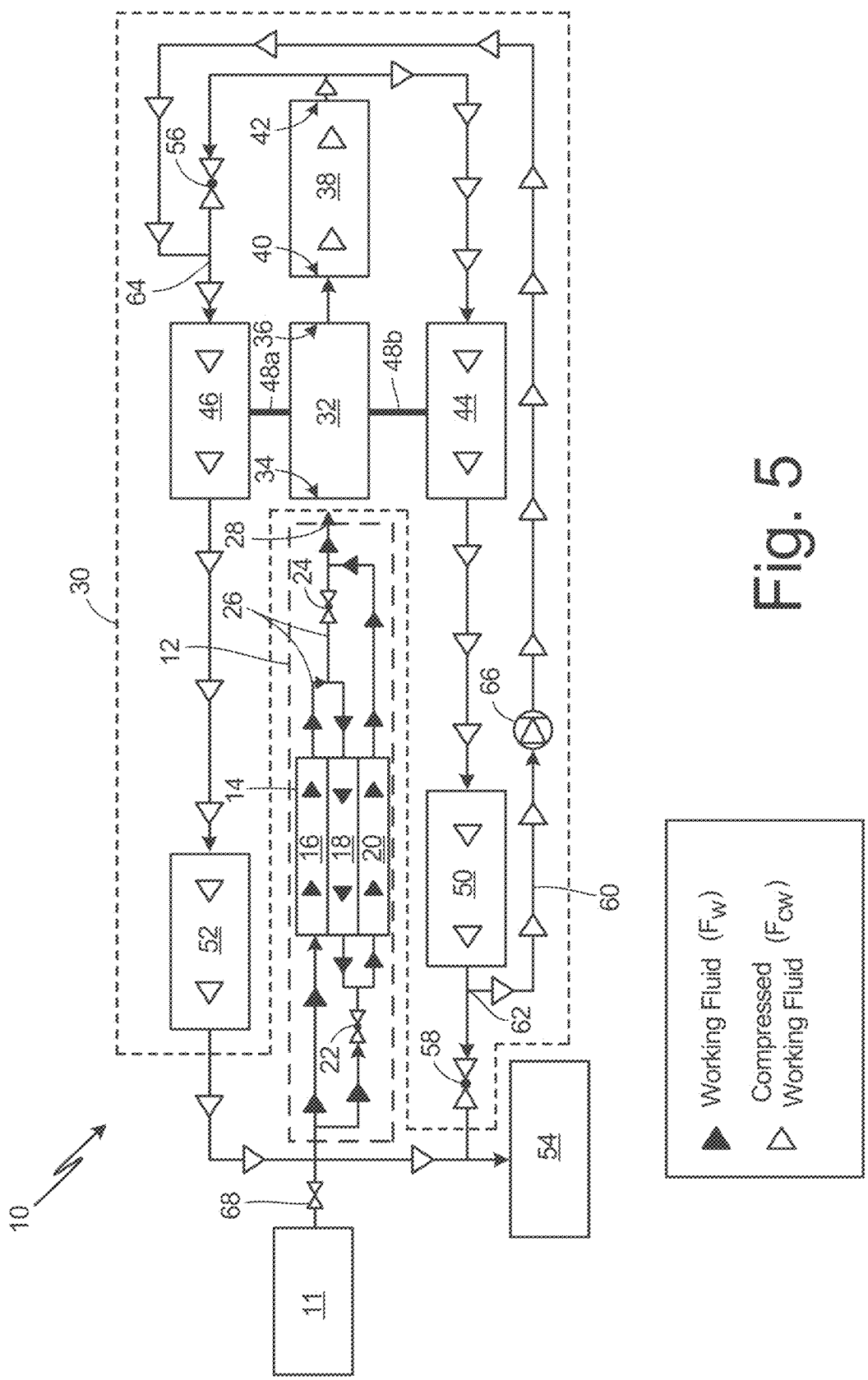
FIG. 5. is a schematic diagram of the ECS of FIG. 1 with a first, second, third, and fourth valve closed.

FIG. 5 is a schematic diagram of ECS 10 with all of valves (22, 24, 56, and 58) closed. All of valves (22, 24, 56, and 58) are closed when fluid source 11 is at a high pressure. As discussed in detail with reference to FIG. 3, primary heat exchanger system 12 operates as a multi-pass heat exchanger when first valve 22 and second valve 24 are closed. While in this mode, as previously discussed with reference to FIG. 3, working fluid $F_W$ makes more passes through primary heat exchanger system 12, which removes pressure from working fluid $F_W$ while cooling working fluid $F_W$ more than when first valve 22 and second valve 24 are open. As discussed in detail with reference to FIG. 4, first turbine 44 and second turbine 46 are fluidically in series when third valve 56 and fourth valve 58 are closed. With first turbine 44 and second turbine 46 fluidically in series, greater expansion occurs in compressed working fluid $F_{CW}$ across first turbine 44 and second turbine 46 in comparison to when third valve 56 and fourth vale 58 are open. Greater expansion in compressed working fluid $F_{CW}$ increases the power output from turbines (44 and 46) in ECS 10 while eliminating excess pressure from compressed working fluid $F_{CW}$. Thus, when all of valves (22, 24, 56, and 58) are closed, both primary heat exchanger system 12 and ACM 30 work together to remove excess pressure from working fluid $F_W$ and compressed working fluid $F_{CW}$ while simultaneously increasing the efficiency of ECS 10. Furthermore, pressure regulating valve 68 can bleed off pressure to help ECS 10 handle high working fluid ($F_W$ or $F_{CW}$) pressure.

Discussion of Possible Embodiments [we Will Complete this Section Once the Claims are Set]

The following are non-exclusive descriptions of possible embodiments of the present invention.

An environmental control system includes a primary heat exchanger with a first hot section, including a first passage fluidically connected to a hot fluid source. A second hot section includes a second passage fluidically connected to the first passage, and a third hot section includes a third passage fluidically connected to the second passage. A heat exchanger outlet line fluidically connected to the second passage and a bypass line fluidically connecting both the first passage and the second passage with the heat exchanger outlet line. The environmental control system also includes an air cycle machine, including a compressor, wherein an inlet of the compressor is fluidically connected to the heat exchanger outlet line. A secondary heat exchanger fluidically connected to an outlet of the compressor, a first turbine, and a second turbine, wherein the first and second turbines are fluidically connected to an outlet of the secondary heat exchanger. The first and second turbines are mechanically coupled to the compressor via a shaft. A first load cooling heat exchanger fluidically connected to the first turbine and a second load cooling heat exchanger fluidically connected between the second turbine and a system outlet. The environmental control system also includes a first valve, wherein the first valve fluidically connects the hot fluid source and the second passage when the first valve is open. The first valve fluidically connects the hot fluid source and the third passage when the first valve is open. A second valve in the bypass line and a third valve fluidically connected between the secondary heat exchanger and the second turbine. A fourth valve fluidically connected between the first load cooling heat exchanger and the system outlet.

The environmental control system of the preceding paragraph can optionally include, additionally and/or alternatively, any one or more of the following features, configurations and/or additional components:

wherein the primary heat exchanger is a cross-flow heat exchanger and the first and second turbines are fluidically in parallel when the third and fourth valves are open;

wherein the first, second, and third passages direct the hot fluid source in a first direction across the primary heat exchanger when the first and second valves are open;

wherein the primary heat exchanger is configured to cool the hot fluid source;

wherein the primary heat exchanger is a multi-pass heat exchanger when the first and second vales are closed, and wherein the first and second turbines are fluidically in parallel when the third and fourth valves are open;

wherein the first and third sections are configured to direct the hot fluid source in the first direction, and wherein the second section is configured to direct the hot fluid source in a second direction;

further comprising: a re-route line comprising an inlet fluidically connected between the first load cooling heat exchanger and the fourth valve and an outlet fluidically connected between the third valve and the second turbine;

wherein the re-route line comprises a check valve fluidically positioned to prevent backflow in the re-route line;

wherein the primary heat exchanger is a cross-flow heat exchanger when the first and second valves are open, and wherein the first and second turbines are fluidically in series via the re-route line when the third and fourth valves are closed;

wherein the primary heat exchanger is a multi-pass heat exchanger with the first passage, the second passage, and the third passage fluidically connected in series when the first and second valves are closed, and wherein the first and second turbines are fluidically in series via the re-route line when the third and fourth valves are closed;

wherein the first turbine is mechanically coupled to the compressor via a first shaft, and wherein the second turbine is mechanically coupled to the compressor via a second shaft;

further comprising: a pressure regulating valve fluidically connected between the hot fluid source and the first passage, wherein the pressure regulating valve is also fluidically connected between the hot fluid source and the first valve; and an aircraft comprising the environmental control system of claim 1.

In another example, a method of controlling flow in an environmental control system includes directing a first portion of an engine bleed fluid through a first passage of a primary heat exchanger. The primary heat exchanger also includes a second passage and a third passage. A second portion of the engine bleed fluid is directed through a first valve in an open position and into the second and third passage of the primary heat exchanger. The second portion is divided between the second passage and the third passage. The second portion of the engine bleed fluid is directed through the third passage to an outlet of the primary heat exchanger. The engine bleed fluid is directed through the outlet of the primary heat exchanger to an inlet of a compressor. The first portion of the engine bleed fluid from the first passage and the second portion of the engine bleed fluid from the second passage are directed to a second turbine via a bypass line when the second valve is in an opened position. The method also includes directing the engine bleed fluid from the second valve to the inlet of the compressor and compressing the engine bleed fluid via the compressor into a compressor exhaust fluid. The compressor is mechanically coupled to a first turbine and a second turbine via a shaft. The compressor exhaust fluid is directed through an outlet of the compressor and through a secondary heat exchanger. A first portion of the compressor exhaust fluid is directed into the first turbine and through a first load cooling heat exchanger. The compressor exhaust fluid is directed from the first load cooling heat exchanger and through a fourth valve to a system outlet. A second portion of the compressor exhaust fluid is directed through a third valve and into the second turbine when the third valve is in an open position. The second portion of the compressor exhaust fluid is directed from the second turbine through a second load cooling heat exchanger and to the system outlet.

The method of the preceding paragraph can optionally include, additionally and/or alternatively, any one or more of the following features, configurations and/or additional components:

further comprising: directing all of the engine bleed fluid through the first passage, then through the second passage, then through the third passage, and through the outlet of the primary heat exchanger when the first valve and the second valves are in a closed position;

further comprising: closing the third valve and the fourth valve; directing all of the compressor exhaust fluid through the secondary heat exchanger and then into the first turbine; directing the exhaust fluid of the first turbine through the first load cooling heat exchanger and into the second turbine via a re-route line; and directing the exhaust fluid of the second turbine through the second load cooling heat exchanger and then through the system outlet;

further comprising: preventing backflow in the re-route line via a check valve;

further comprising: operating the primary heat exchanger as a multi-pass heat exchanger by closing the first valve and the second valve; fluidically connecting the first turbine and the second turbine in series by closing the third valve and the fourth valve and directing the exhaust fluid of the first turbine into a re-route line, wherein the re-route line comprises an inlet fluidically connected between the first load cooling heat exchanger and the fourth valve and an outlet fluidically connected between the third valve and the second turbine; and preventing backflow in the re-route line via a check valve;

further comprising: regulating the pressure into the environmental control system via a pressure regulating valve, wherein the pressure regulating valve is fluidically connected between an engine bleed source and the first passage of the primary heat exchanger, and wherein the pressure regulating valve is fluidically connected between the engine bleed source and the first valve; and further comprising: cooling the compressor exhaust fluid in the secondary heat exchanger.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. An environmental control system comprising:
a primary heat exchanger comprising:
   a first hot section comprising:
      a first passage fluidically connected to a hot fluid source;
   a second hot section comprising:
      a second passage fluidically connected to the first passage; and
   a third hot section comprising:
      a third passage fluidically connected to the second passage;
   a heat exchanger outlet line fluidically connected to the third passage;
   a bypass line fluidically connecting both the first passage and the second passage with the heat exchanger outlet line;
an air cycle machine further comprising:
   a compressor, wherein an inlet of the compressor is fluidically connected to the heat exchanger outlet line;
   a secondary heat exchanger fluidically connected to an outlet of the compressor;
   a first turbine;
   a second turbine, wherein the first and second turbines are fluidically connected to an outlet of the secondary heat exchanger, and wherein the first and second turbines are mechanically coupled to the compressor via a shaft;
   a first load cooling heat exchanger fluidically connected to the first turbine; and
   a second load cooling heat exchanger fluidically connected between the second turbine and a system outlet;
a first valve, wherein the first valve fluidically connects the hot fluid source and the second passage when the first valve is open, and wherein the first valve fluidically connects the hot fluid source and the third passage when the first valve is open;
a second valve in the bypass line;
a third valve fluidically connected between the secondary heat exchanger and the second turbine; and a fourth valve fluidically connected between the first load cooling heat exchanger and the system outlet.

2. The environmental control system of claim 1, wherein the primary heat exchanger is a cross-flow heat exchanger and the first and second turbines are fluidically in parallel when the third and fourth valves are open.

3. The environmental control system of claim 2, wherein the first, second, and third passages direct the hot fluid source in a first direction across the primary heat exchanger when the first and second valves are open.

4. The environmental control system of claim 3, wherein the primary heat exchanger is configured to cool the hot fluid source.

5. The environmental control system of claim 1, wherein the primary heat exchanger is a multi-pass heat exchanger when the first and second valves are closed, and wherein the first and second turbines are fluidically in parallel when the third and fourth valves are open.

6. The environmental control system of claim 5, wherein the first and third sections are configured to direct the hot fluid source in the first direction, and wherein the second section is configured to direct the hot fluid in a second direction.

7. The environmental control system of claim 1 further comprising:
a re-route line comprising an inlet fluidically connected between the first load cooling heat exchanger and the fourth valve and an outlet fluidically connected between the third valve and the second turbine.

8. The environmental control system of claim 7, wherein the re-route line comprises a check valve fluidically positioned to prevent backflow in the re-route line.

9. The environmental control system of claim 8, wherein the primary heat exchanger is a cross-flow heat exchanger when the first and second valves are open, and wherein the first and second turbines are fluidically in series via the re-route line when the third and fourth valves are closed.

10. The environmental control system of claim 8, wherein the primary heat exchanger is a multi-pass heat exchanger with the first passage, the second passage, and the third passage fluidically connected in series when the first and second valves are closed, and wherein the first and second turbines are fluidically in series via the re-route line when the third and fourth valves are closed.

11. The environmental control system of claim 1, wherein the first turbine is mechanically coupled to the compressor via a first shaft, and wherein the second turbine is mechanically coupled to the compressor via a second shaft.

12. The environmental control system of claim 1, further comprising:
a pressure regulating valve fluidically connected between the hot fluid source and the first passage, wherein the pressure regulating valve is also fluidically connected between the hot fluid source and the first valve.

13. An aircraft comprising the environmental control system of claim 1.

14. A method of controlling flow in an environmental control system comprising:
directing a first portion of an engine bleed fluid through a first passage of a primary heat exchanger, wherein the primary heat exchanger also comprises a second passage, and a third passage;
directing a second portion of the engine bleed fluid through a first valve in an open position and into the second and third passage of the primary heat exchanger, wherein the second portion is divided between the second passage and the third passage;
directing the second portion of the engine bleed fluid in the third passage to an outlet of the primary heat exchanger;
directing the engine bleed fluid at the outlet of the primary heat exchanger to an inlet of a compressor;
directing both the first portion of the engine bleed fluid from the first passage and the second portion of the engine bleed fluid in the second passage to a second valve via a bypass line when the second valve is in an opened position;
directing the engine bleed fluid from the second valve to the inlet of the compressor;
compressing the engine bleed fluid via the compressor into a compressor exhaust fluid, wherein the compressor is mechanically coupled to a first turbine and a second turbine via a shaft;
directing the compressor exhaust fluid through an outlet of the compressor and through a secondary heat exchanger;
directing a first portion of the compressor exhaust fluid into the first turbine and through a second load cooling heat exchanger;
directing an exhaust fluid of the first turbine through a first load cooling heat exchanger, then through a fourth valve in an open position, and then to a system outlet;
directing a second portion of the compressor exhaust fluid through a third valve and into the second turbine when the third valve is in an open position; and
directing an exhaust fluid of the second turbine through a second load cooling heat exchanger and then to the system outlet.

15. The method of claim 14 further comprising:
directing all of the engine bleed fluid through the first passage, then through the second passage, then through the third passage, and through the outlet of the primary heat exchanger when the first valve and the second valves are in a closed position.

16. The method of claim 15 further comprising:
closing the third valve and the fourth valve;
directing all of the compressor exhaust fluid through the secondary heat exchanger and then into the first turbine;
directing the exhaust fluid of the first turbine through the first load cooling heat exchanger and into the second turbine via a re-route line; and
directing the exhaust fluid of the second turbine through the second load cooling heat exchanger and then through the system outlet.

17. The method of claim 16, further comprising:
preventing backflow in the re-route line via a check valve.

18. The method of claim 14 further comprising:
operating the primary heat exchanger as a multi-pass heat exchanger by closing the first valve and the second valve;
fluidically connecting the first turbine and the second turbine in series by closing the third valve and the fourth valve and directing the exhaust fluid of the first turbine into a re-route line, wherein the re-route line comprises an inlet fluidically connected between the first load cooling heat exchanger and the fourth valve and an outlet fluidically connected between the third valve and the second turbine; and
preventing backflow in the re-route line via a check valve.

19. The method of claim 14 further comprising:
regulating the pressure into the environmental control system via a pressure regulating valve, wherein the pressure regulating valve is fluidically connected between an engine bleed source and the first passage of the primary heat exchanger, and wherein the pressure regulating valve is fluidically connected between the engine bleed source and the first valve.

20. The method of claim 14 further comprising:
cooling the compressor exhaust fluid in the secondary heat exchanger.

\* \* \* \* \*